(12) United States Patent
Duron et al.

(10) Patent No.: US 9,092,205 B2
(45) Date of Patent: Jul. 28, 2015

(54) NON-INTERRUPTING PERFORMANCE TUNING USING RUNTIME RESET

(71) Applicant: International Business Machines Corporation, Armonk, NY (US)

(72) Inventors: Mike C. Duron, Austin, TX (US); Mark D. McLaughlin, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 281 days.

(21) Appl. No.: 13/660,576

(22) Filed: Oct. 25, 2012

(65) Prior Publication Data

US 2014/0122850 A1    May 1, 2014

(51) Int. Cl.
*G06F 9/00* (2006.01)
*G06F 1/24* (2006.01)

(52) U.S. Cl.
CPC ........................................ *G06F 1/24* (2013.01)

(58) Field of Classification Search
CPC ......................................................... G06F 1/24
USPC ............................................................. 713/1
See application file for complete search history.

(56) References Cited

U.S. PATENT DOCUMENTS

| | | | |
|---|---|---|---|
| 5,463,775 A | 10/1995 | Dewitt et al. | |
| 5,732,240 A | 3/1998 | Caccavale | |
| 6,502,212 B1 | 12/2002 | Coyle et al. | |
| 6,687,765 B2 | 2/2004 | Surugucchi et al. | |
| 6,941,450 B2 | 9/2005 | Atherton et al. | |
| 7,487,235 B2 | 2/2009 | Andrews et al. | |
| 7,962,887 B2 | 6/2011 | Anderson et al. | |
| 8,032,329 B2 | 10/2011 | Chou et al. | |
| 8,149,874 B2 | 4/2012 | Ching et al. | |
| 2004/0098541 A1* | 5/2004 | Megiddo et al. | 711/129 |
| 2004/0210884 A1* | 10/2004 | Raghavachari et al. | 717/158 |
| 2005/0204125 A1 | 9/2005 | Chin | |
| 2006/0069876 A1* | 3/2006 | Bansal et al. | 711/134 |
| 2007/0240162 A1* | 10/2007 | Coleman et al. | 718/104 |
| 2009/0125854 A1* | 5/2009 | Hakura et al. | 716/4 |
| 2011/0225323 A1 | 9/2011 | Duron et al. | |
| 2011/0320643 A1 | 12/2011 | Brice, Jr. et al. | |
| 2011/0320702 A1 | 12/2011 | Lin | |
| 2012/0173717 A1* | 7/2012 | Kohli | 709/224 |
| 2013/0080761 A1* | 3/2013 | Garrett et al. | 713/100 |
| 2013/0166724 A1* | 6/2013 | Bairavasundaram et al. | 709/226 |
| 2014/0047342 A1* | 2/2014 | Breternitz et al. | 715/735 |

* cited by examiner

*Primary Examiner* — Thomas Lee
*Assistant Examiner* — Volvick Derose
(74) *Attorney, Agent, or Firm* — Garg Law Firm, PLLC; Rakesh Garg; Parashos T. Kalaitzis

(57) ABSTRACT

A method, system, and computer program product for non-interrupting performance tuning using runtime reset are provided in the illustrative embodiments. Component performance data from a component of a data processing system is analyzed. The component participates in processing a workload of a workload type. The analyzing determines a characteristic of the workload. A performance requirement of the workload is determined according to a performance requirement of the workload type. A set of preferred performance tuning parameter values is identified to apply to the component to meet the performance requirement of the workload. The set of preferred performance tuning parameter values is sent to the component such that the component is tuned using a value in the set of preferred performance tuning parameter values to meet the performance requirement of the workload.

16 Claims, 5 Drawing Sheets

*FIG. 2*
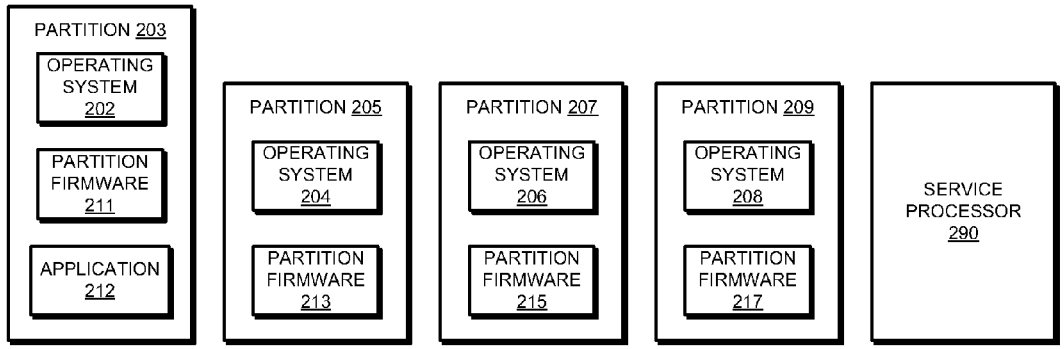
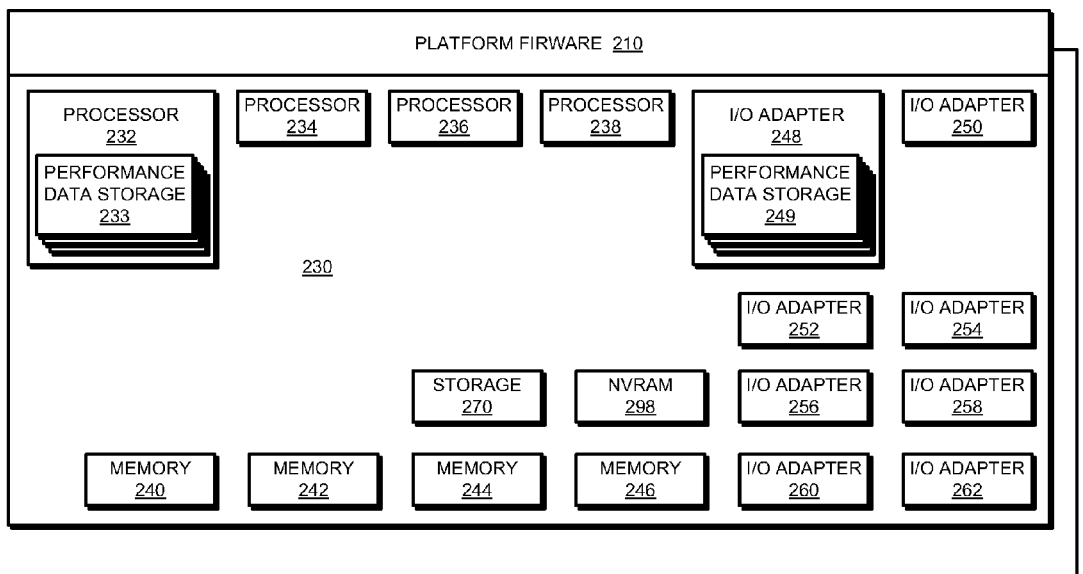

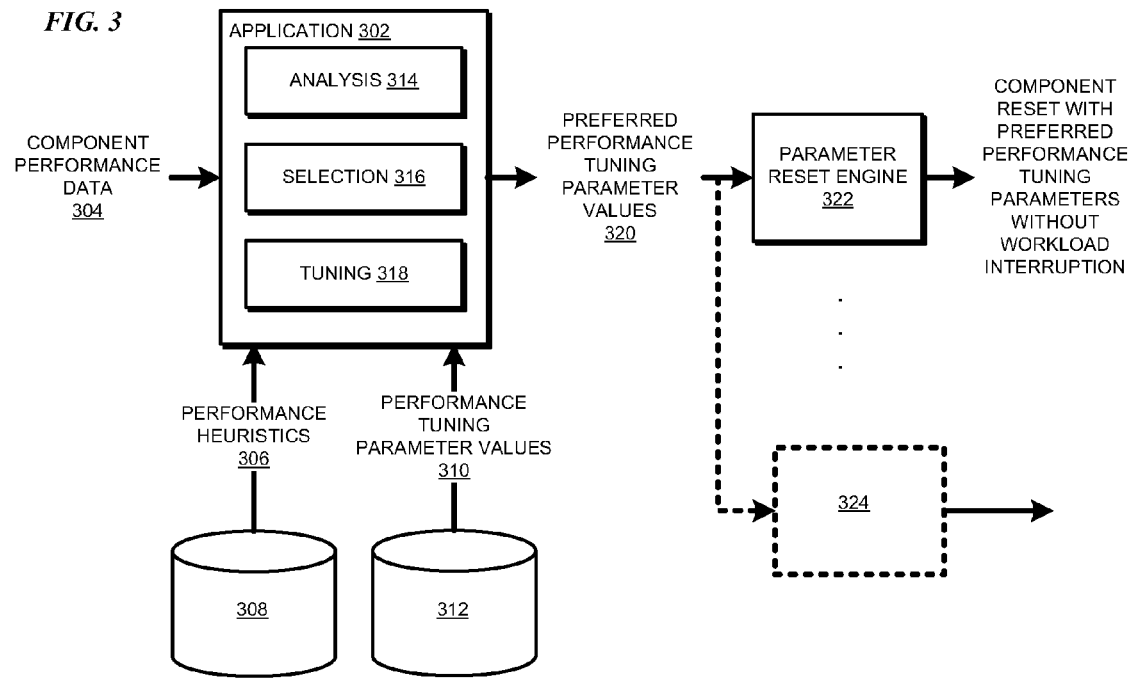
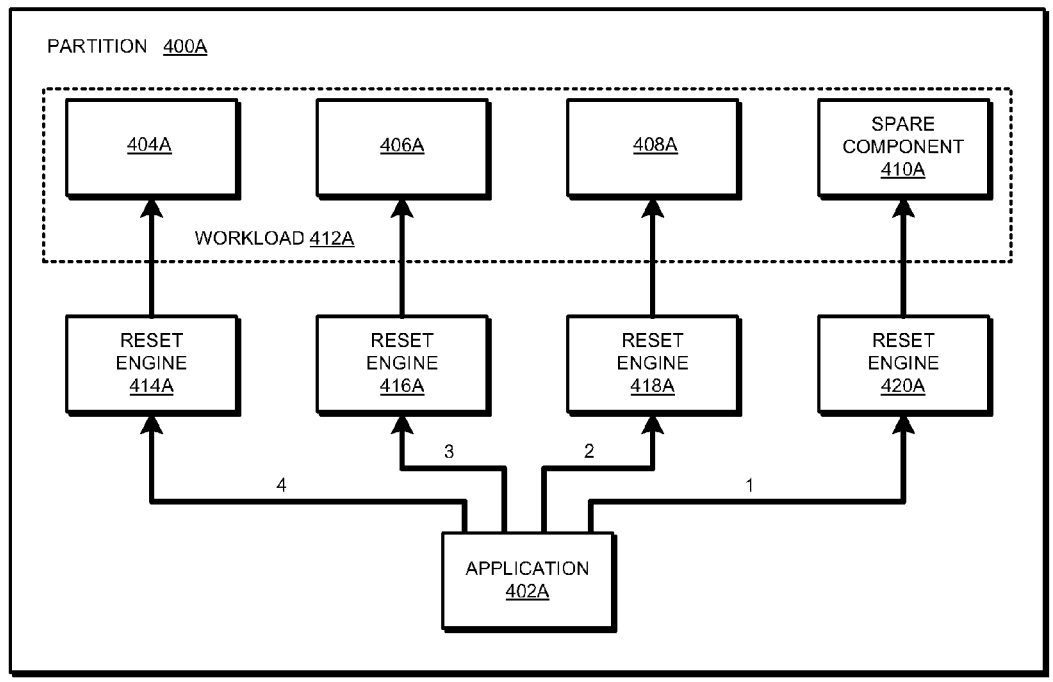

NON-INTERRUPTING PERFORMANCE TUNING USING RUNTIME RESET

BACKGROUND

1. Technical Field

The present invention relates generally to a method, system, and computer program product for improving performance of a data processing system component. More particularly, the present invention relates to a method, system, and computer program product for non-interrupting performance tuning using runtime component or chip reset.

2. Description of the Related Art

Data processing systems can be configured in a variety of ways. For example, the components in a data processing system may be configured to operate in a manner such that the data processing system behaves as a single data processing unit. The memory in such a configuration operates to support data manipulation for the single data processing unit.

As another example, data processing systems can be divided into logical partitions (LPARs). Such data processing systems are also known as logical partitioned data processing systems. A logical partition is also known simply as a "partition." Each partition operates as a separate data processing system independent of the other partitions. Generally, a partition management firmware component manages partitions through their creation and subsequent assignment of hardware resources. A Hypervisor is an example of such partition management firmware.

Typically, a partition is created to execute a specific type of workload. For example, one partition may be created for serving as a database server, a web server, a scientific computation node, a transaction engine, or for serving another type of workload.

A workload includes instructions for a processor to execute. Executing an instruction of a workload in a data processing system, such as on a partition, results in operations with respect to one or more components of the data processing environment. Performance of one or more operations results in altering a state or a condition of a component in the data processing environment.

SUMMARY

The illustrative embodiments provide a method, system, and computer program product for non-interrupting performance tuning using runtime reset. An embodiment analyzes, using a processor and a memory, component performance data from a component of a data processing system, wherein the component participates in processing a workload of a workload type, wherein the analyzing determines a characteristic of the workload. The embodiment determines a performance requirement of the workload according to a performance requirement of the workload type. The embodiment identifies a set of preferred performance tuning parameter values to apply to the component to meet the performance requirement of the workload. The embodiment sends the set of preferred performance tuning parameter values to the component such that the component is tuned using a value in the set of preferred performance tuning parameter values to meet the performance requirement of the workload.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a block diagram of an example logically partitioned platform in which the illustrative embodiments may be implemented;

FIG. 3 depicts a block diagram of an example application for non-interrupting performance tuning using runtime reset in accordance with an illustrative embodiment;

FIG. 4A depicts an example configuration for non-interrupting performance tuning using runtime reset in accordance with an illustrative embodiment;

DETAILED DESCRIPTION

Figure 1:
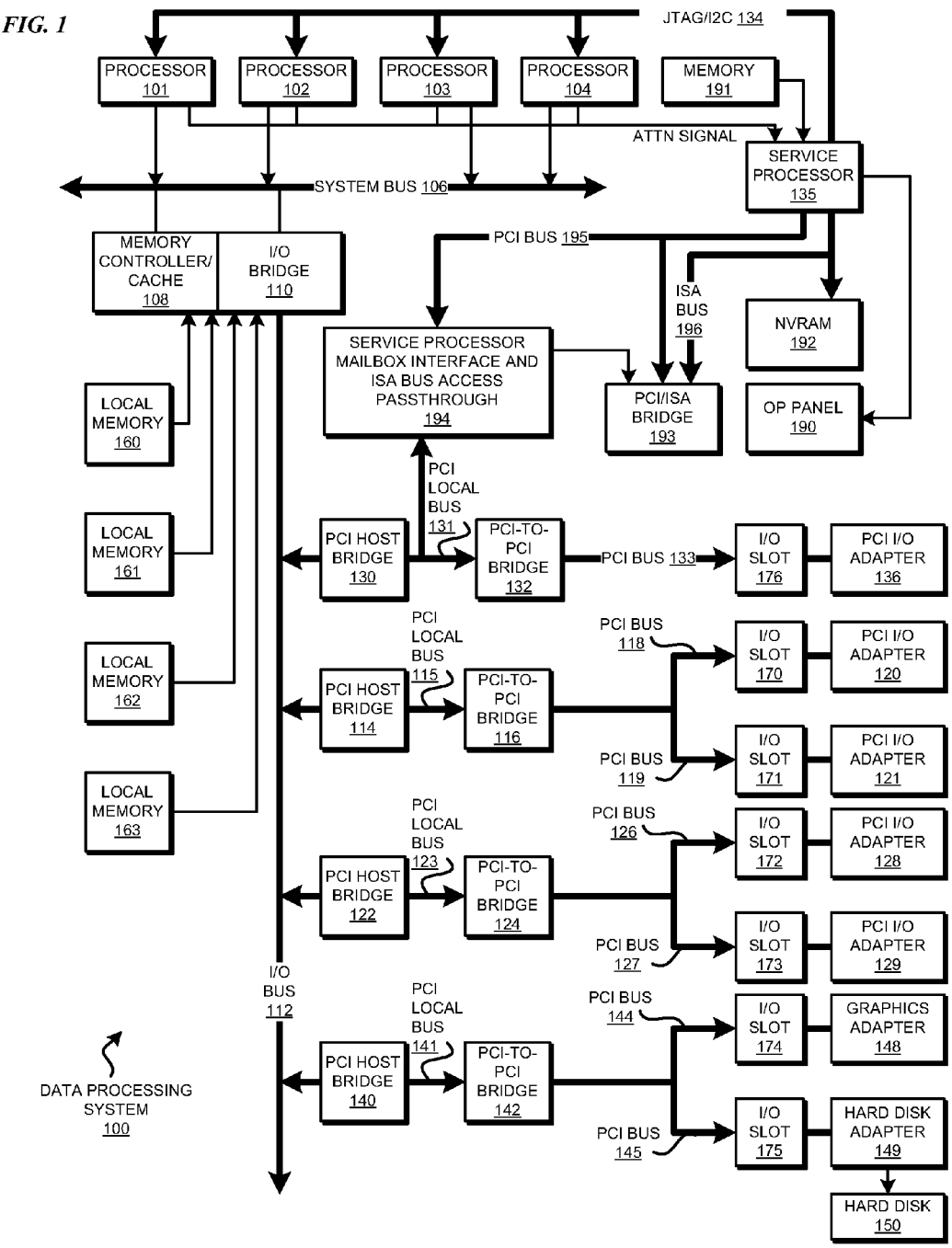
FIG. 1 depicts a block diagram of a data processing system in which the illustrative embodiments may be implemented.

The illustrative embodiments recognize that different types of workloads can benefit from performance tuning the data processing system components according to the specific needs of those types of workloads. For example, the performance configuration of a partition that is responsible for computation intensive workloads is quite different from the performance configuration of another partition that handles I/O intensive workloads.

The illustrative embodiments recognize that adjusting performance tuning parameters of certain data processing system components, such as a processor core, an I/O controller, or a network adapter, for a given workload type can improve the performance of the data processing system for a workload of that workload type.

Presently, some data processing systems, such as some partitions, are configured as a general purpose data processing system that is capable of executing a variety of workloads. Such a data processing system provides adequate performance for a variety of workload types but is not tuned for performance above a threshold for any particular type of workload.

Some present data processing systems, such as some partitions, are configured specifically for certain types of workloads. However, the illustrative embodiments recognize that these partitions are configured based on pre-determined characteristics expected from a workload that will execute on those partitions. If the actual workload demonstrates variations from those pre-determined characteristics at run-time, the reconfiguration process requires interrupting the operation of the partition, reconfiguring the partition, and restarting the operation. The illustrative embodiments recognize that the present methods of performance tuning a data processing system's components are inflexible, disruptive, offline, or a combination thereof.

The illustrative embodiments used to describe the invention generally address and solve the above-described problems and other problems related to performance tuning of data processing systems depending on the type of workloads executing on the data processing system. The illustrative embodiments provide a method, system, and computer program product for non-interrupting performance tuning using runtime reset.

For example, an embodiment determines that a workload generates a pattern of data traffic when executing in a partition. Based on the observed traffic pattern, the embodiment can determine a type of the workload. Based on the type of the workload, an embodiment can determine, such as by using performance heuristics specific to the workloads or the data processing system, certain performance requirements of workloads of that type. Once an embodiment identifies the performance requirements, the embodiment can determine a preferred set of values of a set of performance tuning parameters, such as buffer sizes, queue depths, and cache settings in a processor core in the partition, to execute the workload while achieving the desired performance level from the partition.

An embodiment applies the preferred set of values in a non-interrupting manner during runtime of the partition while executing the workload. For example, taking a processor core as an example performance tunable component in a multiprocessor partition, an embodiment can supply the preferred set of values to a Power On Reset Engine (PORe) associated with the processor core. The PORe resets the processor with the preferred set of values while other processors in the partition continue to execute the workload. The reset processor takes over for another processor in the partition, and the other processor is reset in a similar manner.

An embodiment can perform non-interrupting performance tuning using runtime reset in this manner on one or more components at a time. For example, in an example eight-processor partition, if two processors are spare and six processors are executing a workload, an embodiment can reset the two spare processors and proceed to reset the remaining processors two processors at a time within the scope of the illustrative embodiments.

The illustrative embodiments are described with respect to certain components and their performance tuning parameters only as examples. Such components or parameters are not intended to be limiting to the invention. For example, an illustrative embodiment described with respect to a processor core and corresponding performance data and parameters can be implemented with respect to any other performance tunable component in a similar manner within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code is loaded onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

A data processing system, for example, partition 203, includes application 212. Application 212 comprises program instructions for carrying out the processes of any of the various embodiments. The program instructions may be stored on at least one of one or more computer-readable tangible storage devices (e.g., hard disk 150, NVRAM 192, or a compact disk device coupled with I/O bus 112 in FIG. 1), for execution by at least one of one or more processors (e.g., processors 101-104 in FIG. 1) via at least one of one or more computer-readable memories (e.g., any of local memories 160-163 in FIG. 1). Application 212 may be implemented in any form, including but not limited to a form suitable for execution as a service, a form implemented using hardware and software, or a form suitable for integration with another application for non-interrupting performance tuning using runtime reset. A component, such as processor 232 or I/O adapter 248, includes performance data storage, such as performance counters, registers, or memory. As an example, processor 232 includes performance data storage 233, and I/O adapter 248 includes performance data storage 249. Performance data storage 233 or 249 store historical data over a period about certain performance parameters associated with processor 232 and I/O adapter 248 respectively. For example, using the data in one or more performance data storage 233, an embodiment can tune the configuration of processor 232 for achieving a certain performance when executing a particular type of workload on processor 232.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

With reference to FIG. 3, this figure depicts a block diagram of an example application for non-interrupting performance tuning using runtime reset in accordance with an illustrative embodiment. Application 302 can be implemented as application 212 in FIG. 2.

Application 302 receives component performance data 304 from a component. For example, processor 232 in FIG. 2 may be an example component in a partition. Performance data storage 233 in FIG. 2 may be a set of performance counters or registers associated with processor 232. Performance data storage 233 stores processor 232's performance data, such as values of certain processor parameters over a period of executing a workload that can be used to tune the performance of processor 232 for the type of that workload.

Application 302 also receives or accesses performance heuristics 306, such as from repository 308. Repository 308 may be a data storage device accessible over a data bus in a data processing system or a data storage system accessible over a data network. For example, a set of performance heuristics may be created in a data processing environment over a period based on the types of workloads experienced in that data processing environment and their respective performance requirements. Performance heuristic 306 created in this manner informs application 302 of the performance related requirements of a type of workload from a component of a data processing system on which a workload of that type may execute.

Application 302 also receives performance tuning parameter values 310. Performance tuning parameter values 310 is a set of one or more performance tuning parameter values, which when applied to a component allow that component to perform above a threshold level of performance when participating in the execution of a workload of a particular type. For example, assume again that processor 232 in FIG. 2 is an example component in a partition. Performance tuning parameter values 310 are desired values for certain processor parameters that tune processor 232 to perform above a threshold performance level for a given type of workload.

Application 302 analyzes component performance data 304 using analysis component 314. Analysis component 314 analyzes component performance data 304 to determine a characteristic of a workload executing using the component that supplies component performance data 304. For example, the characteristic of the workload may be a traffic pattern generated by the workload, which may be useful in determining a type of the workload. Some examples of types of workloads are I/O intensive workloads, computation intensive workloads, transactional workloads, persistent workloads, cumulative workloads, or discrete workloads. Those of ordinary skill in the art will be able to categorize workloads in their data processing environment into many other types and the same are contemplated within the scope of the illustrative embodiments.

Selection component 316 selects one or more performance heuristics 306 to retrieve or receive from repository 308. The selection of performance heuristics 306 is based on the characteristic of the workload identified by analysis component 314.

Tuning component 318 prepares preferred performance tuning parameter values 320 to send to one or more parameter reset engines 322. For example, based on performance heuristics 306 applicable to the workload that is using the component that provided component performance data 304, tuning component 316 receives performance tuning parameter values 310. In one embodiment, tuning component 318 selects certain performance tuning parameter values from performance tuning parameter values 310 and sends the selected performance tuning parameter values as preferred performance tuning parameter values 320. In another embodiment, tuning component 318 further modifies one or more of performance tuning parameter values 310 to form preferred performance tuning parameter values 320. Another embodiment allows another application (not shown) to manipulate some or all of performance tuning parameter values 310 to form preferred performance tuning parameter values 320.

Parameter reset engine 322 is an application to reset a component's performance tuning parameters. For example, in one embodiment, parameter reset engine 322 resets the component that provided component performance data 304 such that preferred performance tuning parameter values 320 are applied to the component when the component becomes operational after the reset. In another embodiment, parameter reset engine 324 is a reset engine analogous to parameter reset engine 322 but associated with another component that also participates in the workload that is using the component that provides data 304.

Parameter reset engine 322 resets the component during runtime and without interrupting the execution of the workload. For example, an embodiment may reset the component while another comparable component executes or services the workload, make the component operational after the reset with preferred performance tuning parameter values 320, transfer all or part of the workload from the comparable component to the reset component, and proceed to reset the comparable component with preferred performance tuning parameter values 320.

With reference to FIG. 4A, this figure depicts an example configuration for non-interrupting performance tuning using runtime reset in accordance with an illustrative embodiment. Application 402A is used for non-interrupting performance tuning of components in partition 400A. Application 402A is analogous to application 302 in FIG. 3 and can execute within partition 400A as shown, outside partition 400A (not shown), or a combination thereof.

Components 404A, 406A, 408A, and 410A are components in partition 400A, with component 410A being a spare component. Components 404A-410A are used for processing workload 412A.

Reset engine 414A is associated with component 404A and resets component 404A at runtime and without interrupting the execution of workload 412A. Reset engine 414A resets component 404A to apply a set of preferred performance tuning parameter values to the corresponding performance tuning parameters of component 404A. Reset engine 416A operates similarly in conjunction with component 406A. Reset engine 418A operates similarly in conjunction with component 408A. Reset engine 420A operates similarly in conjunction with component 420A.

In an example operation, starting from component 410A being a spare component, application 402A provides a set of preferred performance tuning parameter values to reset engine 420A (arrow labeled 1). Once component 410A is reset with the preferred performance tuning parameter values, workload processing from component 408A is transferred to post-reset component 410A, making component 408A spare without interrupting the processing of workload 412A.

Application 402A provides the set of preferred performance tuning parameter values to reset engine 418A next (arrow labeled 2). Once component 408A is reset with the preferred performance tuning parameter values, workload processing from component 406A is transferred to post-reset component 408A, making component 406A spare without interrupting the processing of workload 412A.

Application 402A provides the set of preferred performance tuning parameter values to reset engine 416A next (arrow labeled 3). Once component 406A is reset with the preferred performance tuning parameter values, workload processing from component 404A is transferred to post-reset component 406A, making component 404A spare without interrupting the processing of workload 412A.

Application 402A provides the set of preferred performance tuning parameter values to reset engine 414A next (arrow labeled 4). Once component 404A is reset with the preferred performance tuning parameter values, workload processing from component 410A may optionally be transferred to post-reset component 404A, making component 410A spare again, without interrupting the processing of workload 412A.

Figure 4B:
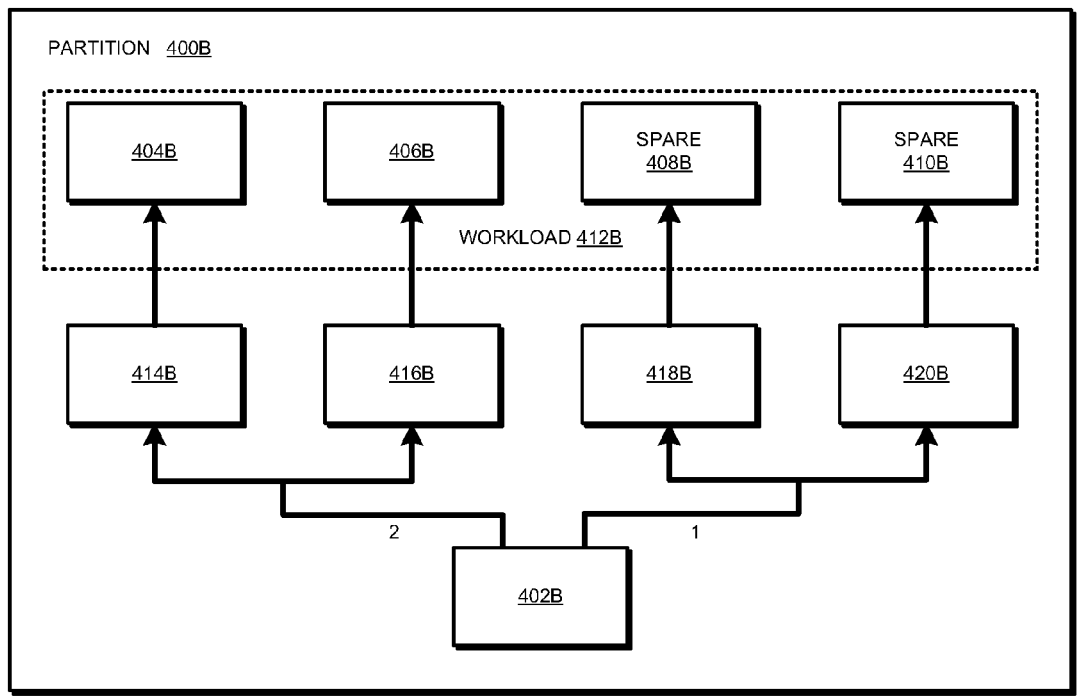
FIG. 4B depicts an example configuration for non-interrupting performance tuning using runtime reset in accordance with an illustrative embodiment.

With reference to FIG. 4B, this figure depicts an example configuration for non-interrupting performance tuning using runtime reset in accordance with an illustrative embodiment. Application 402B is analogous to application 404A in FIG. 4A.

Components 404B, 406B, 408B, and 410B are components in partition 400B, with components 408B and 410B being spare. Components 404B-410B are used for processing workload 412B.

Reset engines 414B-420B are associated with components 404B-410B in a manner analogous to reset engines 414A-420A respectively in FIG. 4A, and operate in a similar manner relative to components 404B-410B, respectively.

In an example operation, starting from components 408B and 410B being spare components, application 402B provides a set of preferred performance tuning parameter values to reset engines 418B and 420B (arrow labeled 1). Once components 408B and 410B are reset with the preferred performance tuning parameter values, workload processing from components 404B and 406B is transferred to post-reset components 408B and 410B, making components 404B and 406B spare without interrupting the processing of workload 412B.

Application 402B provides the set of preferred performance tuning parameter values to reset engines 414B and 416B next (arrow labeled 2). Once component 404B and 406B are reset with the preferred performance tuning parameter values, workload processing from components 408B and 410B may optionally be transferred to post-reset components 404B and 406B, making components 408B and 410B spare again, without interrupting the processing of workload 412B.

Figure 4C:
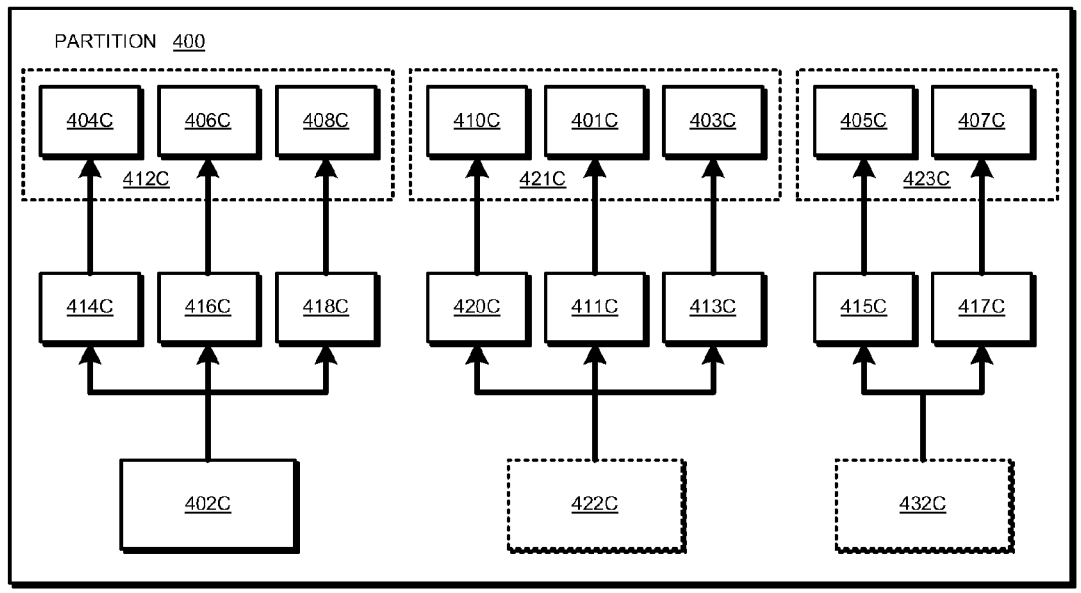
FIG. 4C depicts an example configuration for non-interrupting performance tuning using runtime reset in accordance with an illustrative embodiment.

With reference to FIG. 4C, this figure depicts an example configuration for non-interrupting performance tuning using runtime reset in accordance with an illustrative embodiment. Application 402C is analogous to application 404B in FIG. 4B.

Each of components 401C, 403C, 404C, 405C, 406C, 407C, 408C, 410C in partition 400C is analogous to any of components 404B-410B in partition 400B in FIG. 4B. Components 404C, 406C, and 408C are used for processing workload 412C. Components 410C, 401C, and 403C are used for processing workload 421C. Components 405C and 407C are used for processing workload 423C.

Reset engines 411C, 413C, 414C, 415C, 416C, 417C, 418C, and 420C are associated with components 401C, 403C, 404C, 405C, 406C, 407C, 408C, 410C, respectively, in a manner analogous to reset engines 414B is associated with component 404B in FIG. 4B, and operate in a similar manner relative to their respective components.

Application 402C provides the set of preferred performance tuning parameter values to reset engines 414C, 416C, and 418C in the manner of the embodiment of FIG. 4A or 4B. At a different time, or via a different instance (represented in the figure as application 422C) application 402C provides the set of preferred performance tuning parameter values to reset engines 420C, 411C, and 413C in the manner of the embodiment of FIG. 4A or 4B. At another time, or via another instance (represented in the figure as application 432C) application 402C provides the set of preferred performance tuning parameter values to reset engines 415C and 417C in the manner of the embodiment of FIG. 4A or 4B.

Components depicted in FIGS. 4A-4C may be processor cores or other components as described earlier. Generally, any component that can provide component performance data such as data 304 in FIG. 3, and whose performance can be tuned in the manner described herein, can benefit from the non-interrupting performance tuning using runtime reset according to an embodiment, and such implementations are contemplated within the scope of this disclosure. Although not shown, the illustrative embodiments also contemplate configurations where a reset engine may be associated with and may reset more than one component.

Furthermore, an embodiment may receive or extract component performance data from each component that participates in processing a workload. The embodiment may then elect to reuse the preferred performance tuning parameter values used for resetting another component that also participates in processing the workload, or recompute a different set of preferred performance tuning parameter values for the component. Another embodiment may reuse component performance information received or extracted from one component to reset another component that is also used for processing the same workload as the component that provided the component performance data.

Figure 5:
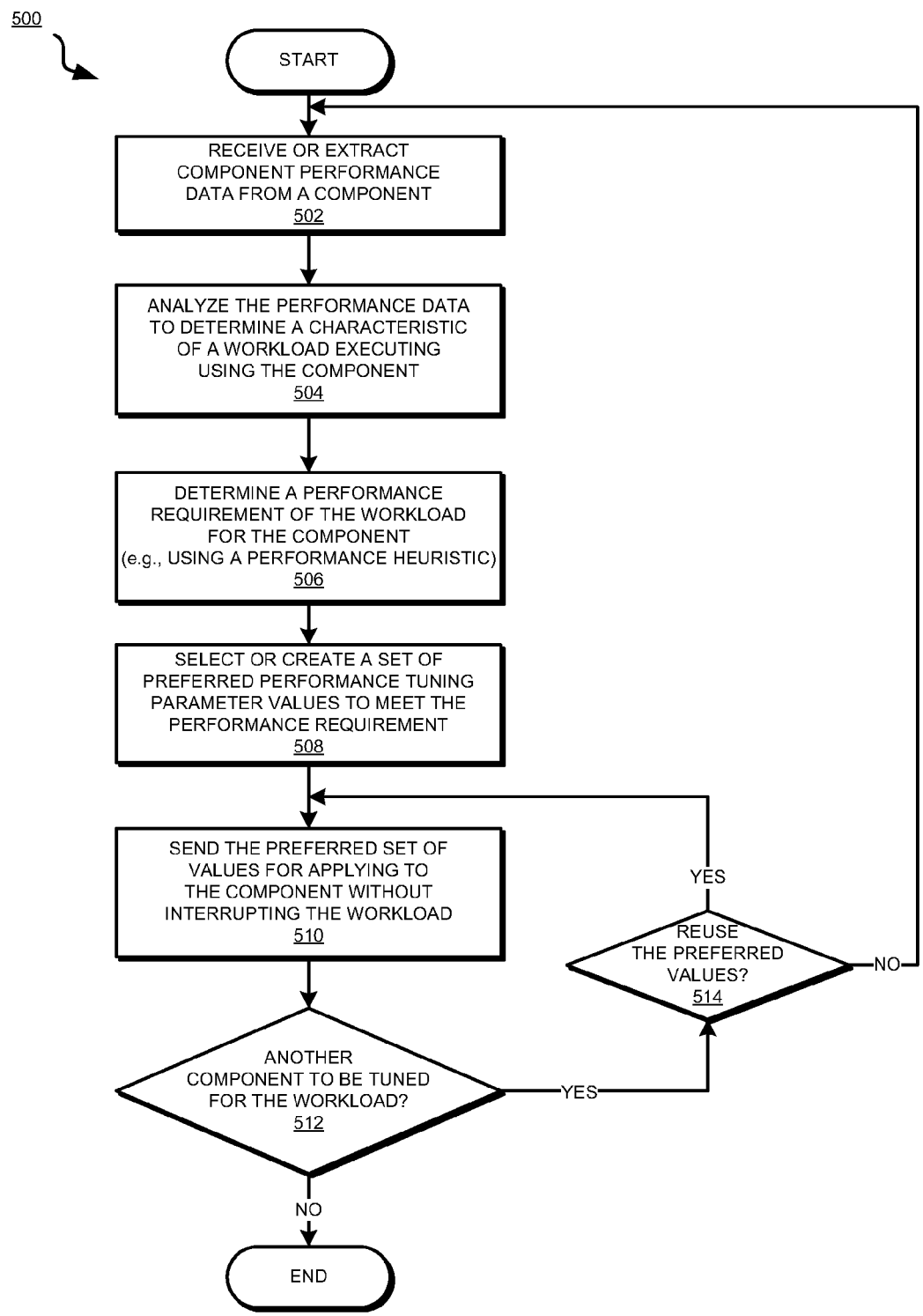
FIG. 5 depicts a flowchart of an example process of non-interrupting performance tuning using runtime reset in accordance with an illustrative embodiment.

With reference to FIG. 5, this figure depicts a flowchart of an example process of non-interrupting performance tuning using runtime reset in accordance with an illustrative embodiment. Process 500 can be implemented in application 402C in FIG. 4C.

Process 500 begins by receiving or extracting component performance data from a component used for executing a workload (step 502). Process 500 analyzes the performance data to determine a characteristic of a workload executing using the component (step 504).

Process 500 determines a performance requirement of the workload, the performance requirement being a performance requirement for the component for processing the workload (step 506). Process 500 selects a set of preferred performance tuning parameter values from a repository, or creates the set of preferred performance tuning parameter values using performance tuning parameter values from a repository, to meet that performance requirement (step 508). Process 500 sends the set of preferred performance tuning parameter values for applying to the component without interrupting the workload (step 510).

Process 500 determines whether another component is to be tuned for the same workload (step 512). If no other component is to be tuned ("No" path of step 512), process 500 ends thereafter. If another component is to be tuned ("Yes" path of step 512), process 500 determines whether the set of preferred performance tuning parameter values selected or created in step 508 can be reused for the other component (step 514). If the set of preferred performance tuning parameter values of step 508 can be reused ("Yes" path of step 514), process 500 returns to step 510. If the set of preferred performance tuning parameter values of step 508 cannot be reused ("No" path of step 514), process 500 returns to step 502 to receive or extract the performance data from the other component.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for non-interrupting performance tuning using runtime reset. Using an embodiment, the performance of a component used for processing a workload can be tuned during system runtime without interrupting the processing of the workload. By tuning the performance of one or more components in the manner of an embodiment, performance of the component or the entire system can be improved to exceed a performance threshold.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for non-interrupting performance tuning using runtime reset, the method comprising:

analyzing component performance data from a component of a data processing system, wherein the component comprises a processor from a plurality of processors operating in the data processing system, wherein the plurality of processors participates in processing a workload of a workload type, and wherein the analyzing determines a characteristic of the workload;

determining a performance requirement of the workload according to a performance requirement of the workload type;

identifying a set of preferred performance tuning parameter values to apply to the component to meet the performance requirement of the workload;

sending the set of preferred performance tuning parameter values to a Power On Reset engine (PORe) associated with the processor;

resetting, by the PORe, the component such that the resetting reconfigures the component to form a reconfigured component, wherein the reconfigured component uses a value in the set of preferred performance tuning parameter values to satisfy the performance requirement of the workload;

continuing, during the resetting, processing the workload using remaining processors in the plurality of processors and without rebooting the data processing system; and taking over, by the reconfigured component, the processing of the workload from a second processor in the plurality of processors.

2. The computer implemented method of claim 1, further comprising:

repeating, using a second PORe associated with the second processor, the sending, the resetting, and the continuing relative to the second processor, the second processor forming a second component.

3. The computer implemented method of claim 2, wherein sending to the component occurs together with the sending to the second component.

4. The computer implemented method of claim 1, wherein the identifying the set of performance tuning parameter values comprises:

selecting the set of preferred performance tuning parameter values from a set of performance tuning parameter values received from a repository.

5. The computer implemented method of claim 1, wherein the identifying the set of performance tuning parameter values comprises:

creating the set of preferred performance tuning parameter values by manipulating a subset of performance tuning parameter values from a set of performance tuning parameter values received from a repository.

6. The computer implemented method of claim 1, further comprising:

receiving the component performance data from the component.

7. The computer implemented method of claim 6, wherein the receiving comprises:

extracting the component performance data from a performance data storage associated with the component, and wherein the component performance data is collected over a period during which a second workload of the workload type is processed.

8. The computer implemented method of claim 7, wherein the second workload is the workload.

9. The computer implemented method of claim 1, further comprising:

determining the workload type using the characteristic of the workload.

10. The computer implemented method of claim 9, wherein the characteristic is a data traffic pattern generated by the workload, and wherein the data traffic pattern generated by the workload matches within a threshold degree a data traffic pattern associated with the workload type.

11. A computer usable program product comprising a computer usable storage device including computer usable code for non-interrupting performance tuning using runtime reset, the computer usable code comprising:

computer usable code for analyzing component performance data from a component of a data processing system, wherein the component comprises a processor from a plurality of processors operating in the data processing system, wherein the plurality of processors participates in processing a workload of a workload type, and wherein the analyzing determines a characteristic of the workload;

computer usable code for determining a performance requirement of the workload according to a performance requirement of the workload type;

computer usable code for identifying a set of preferred performance tuning parameter values to apply to the component to meet the performance requirement of the workload;

computer usable code for sending the set of preferred performance tuning parameter values to a Power On Reset engine (PORe) associated with the processor;

computer usable code for resetting, by the PORe, the component such that the resetting reconfigures the component to form a reconfigured component, wherein the reconfigured component uses a value in the set of preferred performance tuning parameter values to satisfy the performance requirement of the workload;

computer usable code for continuing, during the resetting, processing the workload using remaining processors in the plurality of processors and without rebooting the data processing system; and computer usable code for taking over, by the reconfigured component, the processing of the workload from a second processor in the plurality of processors.

12. The computer usable program product of claim 11, further comprising:

computer usable code for repeating, using a second PORe associated with the second processor, the sending, the resetting, and the continuing relative to the second processor, the second processor forming a second component.

13. The computer usable program product of claim 12, wherein sending to the component occurs together with the sending to the second component.

14. The computer usable program product of claim 11, wherein the computer usable code is stored in a computer readable storage medium in a data processing system, and wherein the computer usable code is transferred over a network from a remote data processing system.

15. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

16. A data processing system for clustering non-interrupting performance tuning using runtime reset, the data processing system comprising:

a storage device including a storage medium, wherein the storage device stores computer usable program code; and a processor, wherein the processor executes the computer usable program code, and wherein the computer usable program code comprises:

computer usable code for analyzing component performance data from a component of a data processing system, wherein the component comprises a processor from a plurality of processors operating in the data processing system, wherein the plurality of processors participates in processing a workload of a workload type, and wherein the analyzing determines a characteristic of the workload;

computer usable code for determining a performance requirement of the workload according to a performance requirement of the workload type;

computer usable code for identifying a set of preferred performance tuning parameter values to apply to the component to meet the performance requirement of the workload;

computer usable code for sending the set of preferred performance tuning parameter values to a Power On Reset engine (PORe) associated with the processor;

computer usable code for resetting, by the PORe, the component such that the resetting reconfigures the component to form a reconfigured component, wherein the reconfigured component uses a value in the set of preferred performance tuning parameter values to satisfy the performance requirement of the workload;

computer usable code for continuing, during the resetting, processing the workload using remaining processors in the plurality of processors and without rebooting the data processing system; and computer usable code for taking over, by the reconfigured component, the processing of the workload from a second processor in the plurality of processors.

* * * * *